United States Patent Office 2,961,419
Patented Nov. 22, 1960

2,961,419

PAPER COATING PROCESS AND COMPOSITIONS THEREFOR

Oscar P. Cohen, Longmeadow, and John F. Heaps and Elmer H. Rossin, Springfield, Mass., assignors to Monsanto Chemical Company, St. Louis, Mo., a corporation of Delaware No Drawing. Filed Nov. 7, 1956, Ser. No. 620,818

17 Claims. (Cl. 260—23)

This invention relates to a process for coating paper with a thin film of a styrene polymer and to aqueous base coating compositions to be employed therein. More particularly, the invention relates to a method of coating the surfaces of paper food containers with a styrene polymer.

Disposable paper containers are widely used for packaging, dispensing, and serving food products. While such containers are inexpensive and sanitary, they suffer from several obvious defects. Among the principal deficiencies of such paper containers is their high vapor permeability. As a consequence of this property, food products stored in such containers tend to dehydrate with a concomitant loss of flavor, texture, etc. Another shortcoming of paper containers is that certain chemicals employed in the manufacture of paper can be extracted by liquid food products and adversely affect the flavor and texture thereof. Wax coatings are frequently employed on paper containers to overcome certain of the shortcomings thereof, but such coatings only partially alleviate the problems discussed above and such wax coatings tend to flake off the containers and become incorporated in the food product.

The aforementioned shortcomings of paper food containers can be overcome by coating the interior surfaces thereof with a continuous film of a styrene polymer. Satisfactory styrene polymer coatings can be applied to paper containers by treating the interior surfaces thereof with an organic solvent solution of a styrene polymer and subsequently evaporating the solvent from the film. For diverse reasons, including the fire and toxicity problems attendant the use of large quantities of solvents, such solvent coating processes are unattractive. Numerous attempts have been made to coat paper with films laid down from styrene polymer latexes, but these attempts have been largely unsuccessful. When paper is treated with a styrene polymer latex and subsequently dried at moderate temperatures, e.g., up to about 400° F., the resulting films are not continuous and can be penetrated by liquids. Continuous water-impermeable films can be prepared from styrene polymer latexes only when large quantities of plasticizer are incorporated therein. The films prepared by this method, however, while continuous and water-impermeable, are quite tacky and paper food containers that are coated therewith stick tightly together when stored in nested stacks. This consideration precludes the employment of plasticized styrene polymer latexes in coating paper food containers as such containers are invariably stored in nested relationship one or more times before they are ultimately filled with food and subsequently disposed of.

It is an object of this invention to provide a process for coating paper with a thin film of a styrene polymer.

Another object of this invention is to provide a process for coating paper with a continuous, nontacky film of a styrene polymer.

Yet another object of this invention is to provide a process for coating paper with a continuous nontacky film of a styrene polymer in which the styrene polymer film is deposited upon the paper from an aqueous dispersion of the styrene polymer.

Other objects and advantages of this invention will become apparent in the following detailed description thereof.

In accordance with this invention, continuous tack-free coatings of a styrene polymer on paper are prepared by coating paper with an aqueous dispersion of a styrene polymer which contains 100 parts of a styrene polymer and from 10 to 75 parts of an organic solvent for said styrene polymer, said organic solvent having a boiling point in the range of 175–325° F., and subsequently heating the coated paper to a temperature at least 50° F. above the boiling point of the organic solvent contained in the aqueous styrene polymer coating composition.

The following examples are set forth to illustrate more clearly the principle and practice of this invention to those skilled in the art. All parts are by weight.

In the examples, the below described styrene polymer latexes are employed:

Latex A

Latex A is a styrene homopolymer latex containing 40 weight percent solids. The average polymer particle size is 0.06 micron.

Latex B

Latex B contains 40 weight percent solids. The solids consist of 100 parts of a styrene homopolymer and 50 parts of butyl benzyl phthalate. The average polymer particle size is 0.2 micron.

Latex C

Latex C contains 50 weight percent polymer solids. The polymer is a copolymer of 98 weight percent styrene and 2 weight percent methacrylic acid. The average polymer particle size is 0.23 micron.

EXAMPLE I

Part A

A coating composition is prepared by incorporating 50 parts of toluene in 250 parts of Latex A. The resulting composition contains 100 parts resins solids and 50 parts of toluene.

Part B

Eight-ounce uncoated paper cups are filled with the aqueous coating composition of Part A above and permitted to stand for 1 minute. The cups are inverted and drained for 30 seconds, and then dried by heating for 5 minutes at 200° F. and finally for 5 minutes at 300° F. The resulting cups have deposited thereon a smooth continuous film of styrene polymer that is not tacky.

The coated cups are filled with a solution of water-soluble green dye which is drained at the end of about 1 minute. The interior of the cup is colorless which indicates that the film is continuous and free of tiny holes.

Several of the coated paper cups are filled with coffee heated to 210° F. and are permitted to stand until the coffee has cooled to 80° F. The cups are then drained and show no discoloration from the coffee. This test establishes that the styrene polymer coating is impermeable to liquids heated to temperatures above 200° F.

Several of the coated cups are filled with water heated to 210° F. and are permitted to stand until the water has cooled to 120° F. As a control, several china cups are similarly filled with 210° F. water which is then permitted to cool to 120° F. The 120° F. water is drunk from both the coated paper cups and the china cups and no difference in taste can be detected. This test confirms the fact that no adulterating substances are extracted from the styrene polymer film or the underlying paper by water heated to above 200° F.

Several of the coated cups are filled with mayonnaise and the top of the cup is sealed with a polystyrene cover. The mayonnaise-containing cups are stored in a household refrigerator for 30 days at 40° F. At the end of the test period, the mayonnaise has undergone no change in appearance or flavor. When mayonnaise is stored in similarly sealed, but uncoated paper cups, the mayonnaise is nearly completely dehydrated and is unusable after the 30-day test.

COMPARATIVE EXAMPLE A

To illustrate the results obtained when cups are coated with an aqueous styrene polymer dispersion containing no organic solvent, the uncoated paper cups employed in Example I, Part B are treated with Latex A following the procedure of Example I, Part B. When a green, water-soluble dye solution is placed in the coated cups, the dye solution penetrates the film and badly discolors the underlying paper cup. This test demonstrates that the films deposited from Latex A are discontinuous. The performance characteristics of the coated paper cups are essentially indistinguishable from those of the uncoated paper cups.

COMPARATIVE EXAMPLE B

To illustrate the results obtained when cups are coated with an aqueous dispersion of styrene polymer containing large quantities of plasticizer, the paper cups employed in Example I, Part B are treated with Latex B by the procedure of Example I, Part B. The styrene polymer films deposited on the interior surface of the cups are noticeably tacky and the cups stick together tenaciously when they are stored in nested stacks.

When a green, water-soluble dye solution is stored in these cups and drained after one minute, the underlying paper is not stained. This test establishes that the styrene polymer films deposited are continuous and impermeable to liquids at room temperature. When, however, the coated cups are filled with coffee heated to 210° F. and permitted to stand until the coffee has cooled to 80° F., the underlying paper is badly discolored. Thus, the styrene polymer films deposited by the procedure of this example are permeable to hot liquids.

EXAMPLE II

A coating composition is prepared by incorporating 25 parts of toluene in 250 parts of Latex A. The resulting composition contains 100 parts resin solids and 25 parts toluene. Paper cups are coated with this composition following the procedure described in Example I, Part B. The performance characteristics of the coated paper cups are essentially the same as those of the coated cups prepared in Example I, Part B.

EXAMPLE III

An aqueous coating composition is prepared by blending together equal parts of the coating composition of Example I, Part A, with Latex B. The resulting composition contains 100 parts of styrene polymer, 22 parts of butyl benzyl phthalate, and 28 parts of toluene. Paper cups that are coated with this composition following the procedure in Example I, Part B have properties similar to those of the coated cups prepared in Example I, Part B.

EXAMPLE IV

Part A

A coating composition is prepared by incorporating 50 parts of toluene, 12 parts of butyl benzyl phthalate and 12 parts of a monostearic acid ester of a polyoxyethylene glycol of 400 molecular weight in 200 parts of Latex C.

Part B

Paper cups are coated with composition of Part A above following the procedure of Example I, Part B. The cups have a tough, continuous, styrene polymer film on their interior surface.

Part C

Boxboard is roll-coated with a thin layer of the coating composition of Part A above and dried at 250° F. for 5 minutes. A continuous, scuff-resistant styrene polymer film is deposited on the boxboard surface.

EXAMPLE V

Example IV, Parts A and B are repeated except that the butyl benzyl phthalate is replaced with 2-ethylhexyl, diphenyl phosphate. Comparable results are obtained.

EXAMPLES VI–VII

Example IV, Parts A and B are repeated except that the toluene is replaced with, respectively, benzene and cyclohexanol. Similar results are obtained except that the styrene polymer films are slightly more permeable than those obtained with the composition of Example IV, Part A.

EXAMPLES VIII–XII

Example IV, Part A is repeated except that the stearic acid ester of the polyoxyethylene glycol of 400 molecular weight is replaced with, resepctively, the ricinoleic acid ester and oleic acid ester of a polyoxyethylene glycol of 400 molecular weight, glycerol monostearate, glycerol mono-oleate and an ethylene oxide condensate of tall oil which contains an average of 10 mols of ethylene oxide per mol of tall oil. Paper cups coated therewith by the procedure of Example I, Part B are not discolored when 210° F. coffee is placed therein and permitted to cool to 80° F. before draining.

The paper coating compositions of this invention comprise an aqueous dispersion containing as the essential components a thermoplastic styrene polymer and an organic solvent for said styrene polymer which boils in the range of 175–325° F. The compositions should contain 10–75 and preferably 25–60 parts of organic solvent for each 100 parts of the styrene polymer.

The styrene polymers included in the compositions of this invention are thermoplastic homopolymers of styrene and thermoplastic interpolymers of styrene containing a predominant portion of styrene, i.e., greater than 50 weight percent and preferably greater than 60 weight percent of styrene. Examples of monomers that may be interpolymerized with the styrene include the conjugated 1,3-dienes, e.g., butadiene, isoprene, etc., alpha, beta unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. If desired, all or a portion of styrene may be replaced with its closely related homologues such as alpha-methylstyrene, o-, m-, p-, methylstyrenes, o-, m-, p-ethylstyrenes, 2,4-dimethylstyrene, etc. In some cases improved results are obtained when two or more compatible thermoplastic polymers of styrene are included in the aqueous coating compositions of this invention. Examples of the mixtures which may be employed advantageously include blends of styrene homopolymers with interpolymers of styrene and butadiene or styrene and an acrylate or methacrylate ester.

Among the solvents for the styrene polymer which may be included in the compositions of this invention are aromatic hydrocarbons such as benzene, toluene, ethylbenzene, the various isomeric xylenes, and chlorobenzene; the chlorinated aliphatic hydrocarbons such as carbon tetrachloride, trichloroethylene, perchloroethylene; etc. As noted earlier herein, the organic solvent employed should boil within the range of 175–325° F. or more preferably within the range of 225–275° F. Optimum results are obtained when the organic solvent for the styrene polymer is substantially water-insoluble. For reasons which are not clearly understood, the quality of the styrene polymer films obtained from the coating compositions containing toluene as the styrene polymer solvent are outstanding and such compositions constitute a most preferred embodiment of the invention.

If desired, various other components may be included in the paper coating compositions of this invention. For example, up to about 30 parts but more preferably 2–20 parts plasticizer may be employed per 100 parts of styrene polymer without causing undue tackiness in the polymer films. When the coating compositions are not to be employed in coating paper food containers, essentially any of the known plasticizers for styrene polymers may be employed. Where the coating compositions are to be employed in the manufacture of paper food containers, however, the plasticizer should be selected from the group consisting of 2-ethylhexyl diphenyl phosphate and the alkyl phthalyl alkyl glycolates such as butyl phthalyl butyl glycolate and ethyl phthalyl ethyl glycolate. Other conventional plastic compounding ingredients such as heat and light stabilizers, antioxidants, minor amounts of natural and synthetic resins, inert fillers, pigments, colorants, etc. may be employed, if desired.

When the aqueous paper coating compositions are subjected to high mechanical shear, as in roll-coating processes, it is highly desirable to incorporate in the coating compositions a small quantity of a nonionic surfactant of the group consisting of partial esters formed between glycerine or sorbitol and fatty acids containing at least 10 carbon atoms in their structure and ethylene oxide condensates of hydrophobic organic compounds containing at least one reactive hydrogen atom and at least 10 carbon atoms in their structure. Such nonionic surfactants are employed in only small amounts of the order of 2–10 weight percent or more preferably 4–8 weight percent.

For the attainment of optimum film properties, the styrene polymer particles contained in the aqueous paper coating composition should have a relatively large particle size. In general, the polymer particles should have an average particle size of about 0.2 micron or larger.

The paper coating compositions are most usually prepared by first making an aqueous emulsion of the styrene polymer particles by the emulsion polymerization technique and then adding the additional components of the final composition thereto with stirring.

Paper may be coated with the aqueous paper coating compositions by conventional techniques such as dip-coating, knife-coating, roll-coating, etc. After removing the excess of the aqueous coating composition from the paper, the films are set by heating the coated paper to a temperature at least 50° F. above the boiling point of the organic solvent included in the coating composition.

The above descriptions and particularly the examples are set forth by way of illustration only. Many other variations and modifications thereof will be apparent to those skilled in the art and can be made without departing from the spirit and scope of the invention herein described.

What is claimed is:

1. An aqueous paper coating composition consisting essentially of an aqueous dispersion of (1) 100 parts of a styrene polymer, (2) 2–20 parts of a plasticizer for said syrene polymer, and (3) 10–75 parts of an organic solvent for said styrene polymer; said composition containing at least 100 parts of water; said styrene polymer being selected from the group consisting of styrene homopolymers and thermoplastic interpolymers of monomers consisting solely of styrene and vinylidene monomers interpolymerizable with styrene, said interpolymers containing at least 50 weight percent of combined styrene; said solvent for the styrene polymer having a boiling point in the range of 175–325° F. and being selected from the group consisting of aromatic hydrocarbons, chlorinated aromatic hydrocarbons, chlorinated aliphatic hydrocarbons and mixtures thereof.

2. An aqueous paper coating composition as in claim 1 wherein the styrene polymer employed is a compatible blend of at least 2 styrene polymers, each of said styrene polymers being selected from the group consisting of styrene homopolymers and styrene interpolymers containing at least 50 weight percent styrene with the other monomers included in the interpolymer being vinylidene monomers interpolymerizable with styrene.

3. A composition as in claim 1 wherein the styrene polymer is a styrene homopolymer.

4. A composition as in claim 3 which contains, for each 100 parts of styrene polymer, 2–10 parts a nonionic surfactant of the group consisting of partial esters of glycerine and fatty acids containing at least 10 carbon atoms, partial esters of sorbitol and fatty acids containing at least 10 carbon atoms and ethylene oxide condensates of hydrophobic organic compounds containing at least one reactive hydrogen atom and 10 carbon atoms.

5. A composition as in claim 4 which contains 2–20 parts of a plasticizer of the group consisting of 2-ethylhexyl diphenyl phosphate, butyl phthalyl butyl glycolate and ethyl phthalyl ethyl glycolate.

6. A composition as in claim 3 wherein the styrene polymer particles have an average particle size larger than about 0.2 micron.

7. A composition as in claim 3 wherein the organic solvent for the styrene polymer is toluene.

8. A composition as in claim 7 which contains, for each 100 parts of styrene polymer, 2–10 parts a nonionic surfactant of the group consisting of partial esters of glycerine and fatty acids containing at least 10 carbon atoms, partial esters of sorbitol and fatty acids containing at least 10 carbon atoms and ethylene oxide condensates of hydrophobic organic compounds containing at least one reactive hydrogen atom and 10 carbon atoms.

9. A composition as in claim 8 which contains 2–20 parts of a plasticizer of the group consisting of 2-ethylhexyl diphenyl phosphate, butyl phthalyl butyl glycolate and ethyl phthalyl ethyl glycolate.

10. An aqueous paper coating composition consisting essentially of a styrene homopolymer latex having an average particle size of at least about 0.2 micron and containing 100 parts of styrene homopolymer, 5–20 parts of 2-ethylhexyl diphenyl phosphate and 25–60 parts of toluene, said composition containing at least 100 parts of water.

11. An aqueous paper coating composition consisting essentially of a styrene homopolymer latex having an average particle size of at least about 0.2 micron and containing 100 parts of styrene homopolymer, 12 parts of 2-ethylhexyl diphenyl phosphate and 25 parts of toluene, said composition containing at least 100 parts of water.

12. The method for preparing a continuous tack-free styrene polymer film on paper which consists essentially of coating paper with the styrene polymer containing aqueous paper coating composition of claim 1, and drying said coated paper at a temperature at least 50° F. above the boiling port of the organic solvent contained in said aqueous paper coating composition.

13. The method for preparing a continuous tack-free styrene polymer film on paper which consists essentially of coating paper with the styrene polymer containing aqueous paper coating composition of claim 2, and drying said coated paper at a temperature at least 50° F. above the boiling point of the organic solvent contained in said aqueous paper coating composition.

14. The method for preparing a continuous tack-free styrene polymer film on paper which consists essentially of coating paper with the styrene polymer containing aqueous paper coating composition of claim 4, and drying said coated paper at a temperature at least 50° F. above the boiling point of the organic solvent contained in said aqueous paper coating composition.

15. The method for preparing paper food containers whose interior food contacting surfaces carry a continuous and impermeable coating of a styrene polymer which consists essentially of contacting the interior surfaces of said paper food containers with the styrene polymer containing aqueous paper coating composition of claim 5, draining said aqueous paper coating composition from the paper food container and drying the paper food container at a temperature at least 50° F. above the boiling point of the organic solvent contained in said aqueous paper coating composition.

16. The method for preparing paper food containers whose interior food contacting surfaces carry a continuous and impermeable coating of a styrene polymer which consists essentially of contacting the interior surfaces of said paper food containers with the styrene polymer containing aqueous paper coating composition of claim 9, draining said aqueous paper coating composition from the paper food container and drying the paper food container at a temperature at least 50° F. above the boiling point of the organic solvent contained in said aqueous paper coating composition.

17. The method for preparing paper food containers whose interior food contacting surfaces carry a continuous and impermeable coating of a styrene polymer which consists essentially of contacting the interior surfaces of said paper food containers with the styrene polymer containing aqueous paper coating composition of claim 10, draining said aqueous paper coating composition from the paper food container and drying the paper food container at a temperature at least 50° F. above the boiling point of the organic solvent contained in said aqueous paper coating composition.

References Cited in the file of this patent

UNITED STATES PATENTS

| | | |
|---|---|---|
| 2,238,956 | Strother | Apr. 22, 1941 |
| 2,313,144 | Gomm | Mar. 9, 1943 |
| 2,537,644 | Carr | Jan. 9, 1951 |
| 2,545,702 | Norris | Mar. 20, 1951 |
| 2,548,318 | Norris | Apr. 10, 1951 |
| 2,634,257 | Faragher | Apr. 7, 1953 |
| 2,787,045 | Crawford | Apr. 2, 1957 |
| 2,790,735 | McLaughlin et al. | Apr. 30, 1957 |

OTHER REFERENCES

Doolittle: "The Technology of Solvents and Plasticizers," Wiley and Sons, N.Y. (1954), pages 904–927.

UNITED STATES PATENT OFFICE
CERTIFICATION OF CORRECTION

November 22, 1960

Patent No. 2,961,419

Oscar P. Cohen et al.

It is hereby certified that error appears in the above numbered patent requiring correction and that the said Letters Patent should read as corrected below.

Column 4, line 25, for "resepctively" read -- respectively --; column 6, lines 12 and 30, for "parts a", each occurrence, read -- parts of a --.

Signed and sealed this 16th day of May 1961.

(SEAL)
Attest:

ERNEST W. SWIDER
Attesting Officer

DAVID L. LADD
Commissioner of Patents